United States Patent
Yang et al.

(10) Patent No.: US 6,560,065 B1
(45) Date of Patent: May 6, 2003

(54) DISK DRIVE HAVING AIRFLOW SUPPRESSOR COMB WITH CURVED EXTENSION FOR REDUCED DISK ROTATION INDUCED AIRFLOW

(75) Inventors: Lin Yang, San Jose, CA (US); Jin Hui Ou-Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 64 days.

(21) Appl. No.: 09/872,236

(22) Filed: May 31, 2001

(51) Int. Cl.⁷ ............................................... G11B 33/14
(52) U.S. Cl. .................................................. 360/97.02
(58) Field of Search ......................... 360/97.01, 97.02, 360/97.03, 98.01

(56) References Cited

U.S. PATENT DOCUMENTS 5,541,791 A    7/1996   Yamasaki et al.
6,271,987 B1 * 8/2001   Allsup et al. ............. 360/97.02

* cited by examiner

*Primary Examiner*—George J. Letscher
(74) *Attorney, Agent, or Firm*—W. Chris Kim, Esq.; Stetina Brunda Garred & Brucker

(57) ABSTRACT

A disk drive includes a disk drive base. The disk drive further includes at least one rotatable disk including a disk surface extending to an outer disk edge. The disk drive further includes a head stack assembly rotatably attached to the disk drive base in operable communication with the disk. The disk drive further includes an airflow suppressor comb coupled to the disk drive base and stationary relative to the disk drive base during operation of the disk drive. The comb includes a comb body disposed adjacent to the outer disk edge, and at least one tine extending from the comb body along the disk surface for mitigating disk rotation induced airflow upon the head stack assembly adjacent to the disk surface. The comb further includes a curved extension extending along the outer disk edge for mitigating turbulent airflow adjacent the outer disk edge.

1 Claim, 1 Drawing Sheet

DISK DRIVE HAVING AIRFLOW SUPPRESSOR COMB WITH CURVED EXTENSION FOR REDUCED DISK ROTATION INDUCED AIRFLOW

CROSS-REFERENCE TO RELATED APPLICATIONS

This application is related to U.S. application Ser. No. 09/872,193, entitled DISK DRIVE HAVING AIRFLOW SUPPRESSOR COMB FOR REDUCED DISK ROTATION INDUCED AIRFLOW, filed on May 31, 2001, incorporated herein by reference.

FIELD OF THE INVENTION

The present invention relates generally to disk drives, and more particularly to a disk drive having an airflow suppressor comb for reduced disk rotation induced airflow.

DESCRIPTION OF THE PRIOR ART

The typical hard disk drive includes a disk drive base, a head disk assembly (HDA), and a printed circuit board assembly (PCBA) attached to the disk drive base. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

A topic of concern is the desire to reduce the effects of airflow generated within the disk drive due to rotation of the disks. Of particular concern is the occurrence of turbulent airflow which may tend to excite a resonance response of the actuator assembly. This results in an increase in the percent off-track values of the associated head. Further, such disk rotation induced airflow may result in a force applied to the actuator assembly, i.e., windage. Further, such disk rotation induced airflow may result in vibration of the disk or disk flutter. In addition, it is contemplated that the disk rotation induced airflow tends to become turbulent radially beyond the outer disk edges due to boundary layer separation occurring within various cavities within the disk drive. Such turbulent airflow further tends to impact the resonance response of the actuator assembly and disk flutter. Accordingly, there is a need in the art for an improved disk drive for mitigation of such disk rotation induced airflow in comparison to the prior art.

SUMMARY OF THE INVENTION

An aspect of the invention can be regarded as a disk drive including a disk drive base. The disk drive further includes at least one rotatable disk including a disk surface extending to an outer disk edge. The disk drive further includes a head stack assembly rotatably attached to the disk drive base in operable communication with the disk. The disk drive further includes an airflow suppressor comb coupled to the disk drive base and stationary relative to the disk drive base during operation of the disk drive. The comb includes a comb body disposed adjacent to the outer disk edge, and at least one tine extending from the comb body along the disk surface for mitigating disk rotation induced airflow upon the head stack assembly adjacent to the disk surface. The comb further includes a curved extension extending along the outer disk edge for mitigating turbulent airflow adjacent the outer disk edge. The curved extension preferably extends from the comb body towards the head stack assembly along the outer disk edge.

DESCRIPTION OF THE PREFERRED EMBODIMENTS

Figure 1:
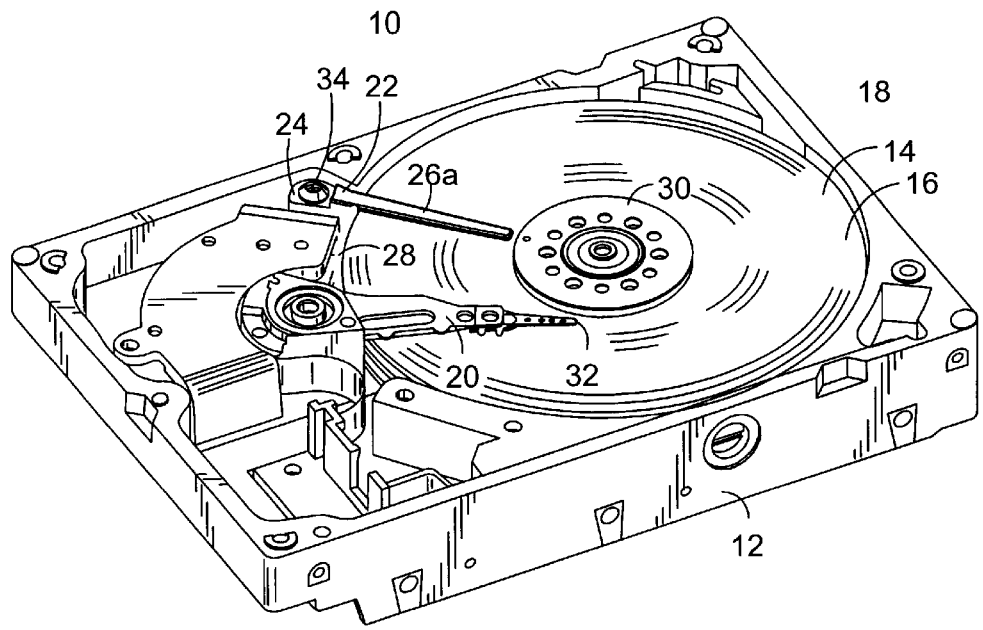
FIG. 1 is a perspective view of a disk drive (cover not shown) including an airflow suppressor comb as constructed in accordance with an aspect of the present invention.
Figure 2:
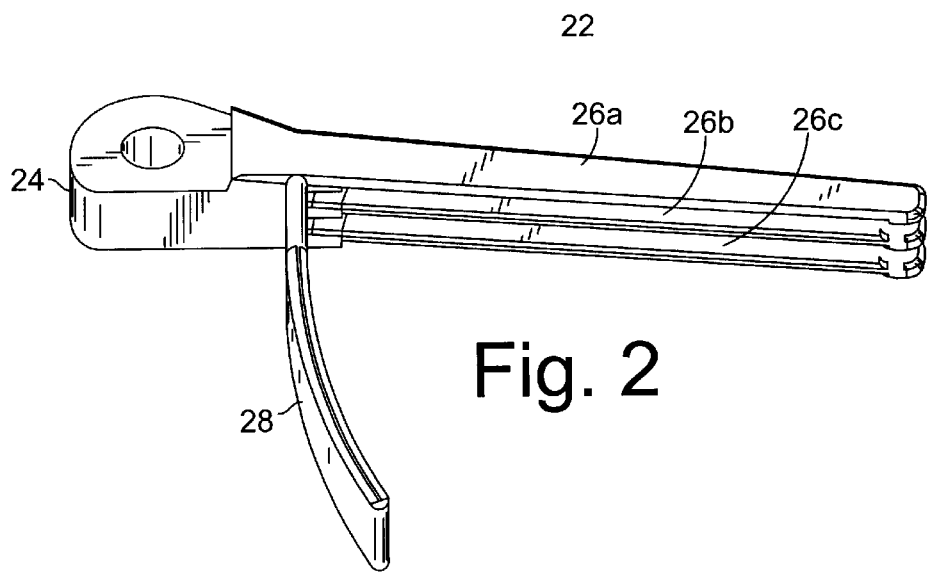
FIG. 2 is a perspective view of the airflow suppressor comb of FIG. 1.

Referring now to the drawings wherein the showings are for purposes of illustrating preferred embodiments of the present invention only, and not for purposes of limiting the same, FIGS. 1–2 illustrate a disk drive and an airflow suppressor comb in accordance with aspects of the present invention.

Referring now to FIG. 1, there is depicted a disk drive 10 constructed in accordance with an aspect of the present invention. The disk drive 10 includes a disk drive base 12. The disk drive 10 further includes at least one disk 14. Additional disks may be provided (not shown). The disk 14 includes at least one disk surface 16. The disk surface 16 extends to an outer disk edge 18. The disk drive 10 further includes a head stack assembly 20 rotatably attached to the disk drive base 12 in operable communication with the disk 14. The disk drive 10 further includes an airflow suppressor comb 22 coupled to the disk drive base 12 and stationary relative to the disk drive base 12 during operation of the disk drive 10. The comb 22 includes a comb body 24 disposed adjacent to the outer disk edge 18. The comb 22 farther includes at least one tine 26a extending from the comb body 24 respectively along the disk surface 16 for mitigating disk rotation induced airflow upon the head stack assembly 20 adjacent to the disk surface 16. Additional tines 26b–c may be included to similarly interact with additional disks (not shown). The comb 22 further includes a curved extension 28 extending along the outer disk edge 18 for mitigating turbulent airflow adjacent the outer disk edge 18.

In further detail according to an embodiment of the present invention, the disk drive base 12 is contemplated to engage a disk drive cover (not shown) that cooperatively house the remainder of the components of the disk drive 10. The disk drive 10 includes a spindle motor hub (not shown) rotatably attached to the disk drive base 12. The disk 14 is mounted upon the hub which may be stacked along with additional disks (not shown). A disk clamp 30 is used to secure the disk 14 to the hub. The head stack assembly 20 includes a transducer head 32. Additional heads may be provided to read data from additional disks and disk surfaces. In this regard, the head stack assembly 20 is configured to rotate relative to the disk 14 for reading and writing data therewith.

The airflow suppressor comb 22 may be attached to the disk drive base 12 via a fastener 34 for maintaining the airflow suppressor comb 22 stationary relative to the disk drive base 12. As shown FIG. 1, the disk drive 10 is configured to rotate the disk 14 in a counter-clockwise direction. In this regard, the suppressor comb 22 is disposed up-stream of the head stack assembly 20 within a common quadrant relative to the disk 14. It is contemplated that the suppressor comb 22 may be angularly disposed about the disk 14 at other locations relative to the head stack assembly 20. Moreover, while the airflow suppressor comb 22 is oriented with the tines 26a–c extending radially with respect to the disk 14, other angular orientations are contemplated.

Rotation of the disk 14 results in disk rotation induced airflow about the disk surface 16. It is contemplated that the airflow suppressor comb 22 and in particular the tines 26a–c thereof mitigate such disk rotation induced airflow in comparison to a disk drive configuration which does not include the airflow suppressor comb 22. In addition to simply creating a physical barrier to such airflow, the tines 26a–c tend to reduce the relative amount of turbulent airflow resulting in a relatively laminar airflow pattern. As such, this tends to mitigate airflow associated with excitation of the head stack assembly rigid body motion (i.e., arm turbulence), resonance response windage experienced by the head stack assembly 20, and vibration of the disk 14 (i.e., disk flutter) in comparison to a disk drive configuration without the, airflow suppressor comb 22.

As mentioned above, the comb 22 further includes the curved extension 28 extending along the outer disk edge 18 for mitigating turbulent airflow adjacent the outer disk edge 18. In this regard, it is contemplated that in the absence of such curved extension 28 upon disk rotation, turbulent airflow may tend to develop beyond the outer disk edge 18 due to boundary layer separation occurring in internal cavities of the disk drive base 12. Preferably, the curved extension 28 extends from the comb body 24 towards the head stack assembly 20 along the outer disk edge 18. In this regard, such development of turbulent airflow may be mitigated thereby shielding the head stack assembly 20 from airflow effects thereon.

We claim:

1. A disk drive comprising:
   a disk drive base;
   at least one rotatable disk including a disk surface extending to an outer disk edge;
   a head stack assembly rotatably attached to the disk drive base in operable communication with the disk; and
   an airflow suppressor comb coupled to the disk drive base and stationary relative to the disk drive base during operation of the disk drive, the comb comprising:
   a comb body disposed adjacent to the outer disk edge;
   at least one tine extending from the comb body along the disk surface for mitigating disk rotation induced airflow upon the head stack assembly adjacent to the disk surface; and
   a curved extension extending from the comb body towards and adjacent the head stack assembly along the outer disk edge for mitigating turbulent airflow adjacent the outer disk edge.

* * * * *